United States Patent
Marczinke et al.

(10) Patent No.: US 6,733,717 B1
(45) Date of Patent: May 11, 2004

(54) INJECTION STRETCH-BLOW MOLDED CONTAINERS MADE OF OLEFIN POLYMERS

(75) Inventors: Bernd Lothar Marczinke, Speyer (DE); Peter John Vaughan Jones, Billingham (GB); Meinolf Kersting, Neustadt (DE); David Fischer, Breunigweiler (DE); Franz Langhauser, Ruppertsberg (DE); Ulrich Moll, St Martin (DE); Wolfgang Bidell, Mutterstadt (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 09/601,356

(22) PCT Filed: Jan. 29, 1999

(86) PCT No.: PCT/EP99/00578

§ 371 (c)(1), (2), (4) Date: Aug. 1, 2000

(87) PCT Pub. No.: WO99/41293

PCT Pub. Date: Aug. 19, 1999

(30) Foreign Application Priority Data

Feb. 11, 1998 (DE) .......................... 198 05 329

(51) Int. Cl.⁷ ............................... B29C 49/06
(52) U.S. Cl. ................. 264/532; 428/35.7; 264/537
(58) Field of Search ................ 264/532, 537; 428/35.7

(56) References Cited

U.S. PATENT DOCUMENTS

| 4,357,288 A | | 11/1982 | Oas et al. |
| 5,350,817 A | | 9/1994 | Winter et al. |
| 5,637,367 A | | 6/1997 | Asanuma et al. |
| 5,756,608 A | * | 5/1998 | Langhauser et al. ........ 526/127 |
| 6,265,339 B1 | * | 7/2001 | Bidell et al. ................. 502/104 |

FOREIGN PATENT DOCUMENTS

| CA | 2241812 | | 4/1997 |
| EP | 151 741 | | 8/1985 |
| EP | 309 138 | | 3/1989 |
| EP | 516 018 | | 12/1992 |
| WO | 97/19991 | | 6/1997 |
| WO | 97/31035 | | 8/1997 |
| WO | WO 98/01481 | * | 1/1998 |

OTHER PUBLICATIONS

Kunststoffe 84 (1994) 10, Heyn, 1415–1418.

* cited by examiner

Primary Examiner—Suzanne E. McDowell
(74) Attorney, Agent, or Firm—Keil & Weinkauf

(57) ABSTRACT

Injection stretch blow molded containers are obtainable from olefin polymers, comprising homopolymers of propylene or copolymers of propylene with other $C_2$–$C_{10}$-alk-1-enes, which are obtainable by polymerizing the corresponding monomers with metallocene catalysts.

Processes for producing injection stretch blow molded containers from olefin polymers, and also the use of olefin polymers for producing injection stretch blow molded containers, are described.

6 Claims, No Drawings

INJECTION STRETCH-BLOW MOLDED CONTAINERS MADE OF OLEFIN POLYMERS

The present invention relates to injection stretch blow molded containers made from olefin polymers, comprising homopolymers of propylene or copolymers of propylene with other $C_2$–$C_{10}$-alk-1-enes, which are obtainable by polymerizing the corresponding monomers with metallocene catalysts. The invention also relates to processes for producing injection stretch blow molded containers from olefin polymers and to the use of olefin polymers for producing injection stretch blow molded containers.

Due to their excellent resistance to heat and chemicals, exceptionally good stiffness and toughness, and also their cost-effectiveness, containers and bottles made from olefin polymers are widely used, for example as packaging for food and drink, household items or cosmetics, and in the medical sector. Injection stretch blow molding (ISBM) has been developed in order to obtain containers of adequate transparency.

Injection stretch blow molding has been known for quite some time. U.S. Pat. No. 4,357,288 teaches a process in which initially a parison is injection molded from a crystalline polypropylene at a temperature which is only slightly higher than the lowest temperature at which a clear melt is obtained, and the parison is then cooled until it hardens. The parison is then heated again to a temperature just below the amorphous flow temperature and stretch blow molded.

EP-A 151 741 describes a process which includes three steps for producing containers from propylene polymers, in which initially a parison is injection molded. The significant step is then that this is preblown in a specific temperature range; only after this has been done is it stretch blow molded. Suitable polymers are propylene copolymers with a comonomer content of from 1 to 6% by weight and a melt flow rate of from 4 to 50 g/10 min. This text also teaches that amounts of up to 1% by weight of nucleating agents, such as dibenzylidenesorbitol or a derivative thereof, may be added to the polymers to improve transparency.

EP-A 309 138 relates to a process for producing containers from propylene copolymers which uses propylene-ethylene copolymers with an ethylene content of from 0.5 to 8% by weight and having a melt flow rate of greater than 50 g/min. The preblowing step is not essential as long as the parison produced by injection molding in the first step is in a partially molten state when it is transferred into the stretch blow molding apparatus. However, the extent to which it is molten must not be so great that it deforms when removed from the injection mold. This implies that a thin skin of a crystalline material must have formed both on the inner surface and on the outer surface of the parison, and the area between these must remain in a partially crystalline or partially amorphous state, in order that the desired properties are obtained in the end product.

The polymers used in this process are obtained by peroxidic degradation. This on the one hand increases the melt flow rate and on the other hand lowers the molar mass distribution, expressed, for example, by the ratio $M_w/M_n$. This brings about a shortening of cycle times. However, the peroxidic degradation also increases the content of soluble fractions and impairs mechanical properties.

H. Heyn, in Kunststoffe 84, 1994, pages 1415–1418 describes a two-step injection stretch blow molding process in which polypropylene parisons which have been separately injection molded are processed after they have been heated once again, to give hollow articles.

A feature common to the known injection stretch blow molding processes for producing transparent containers is that precisely specified, narrow temperature ranges must be maintained during the production process. In particular for propylene homopolymers, this temperature window is so small that it is not possible to ensure problem-free production of containers or of other items when operating continuously, since even small deviations from one of the specified temperatures give products with significantly impaired properties. Although the use of propylene copolymers widens the temperature window to some extent, it is still not sufficient to give completely problem-free container production. In addition, the copolymerization raises the content of soluble fractions and impairs stiffness.

It is an object of the present invention to set aside the disadvantages described and in particular to provide containers which have excellent transparency combined with good mechanical properties and small contents of soluble fractions, and which can be produced by a process which has a wide temperature window and permits short cycle times.

We have found that this object is achieved by means of injection stretch blow molded containers made from olefin polymers, comprising homopolymers of propylene or copolymers of propylene with other $C_2$–$C_{10}$-alk-1-enes, which can be obtained by polymerizing the corresponding monomers with metallocene catalysts, processes for producing injection stretch blow molded containers from olefin polymers and the use of olefin polymers for producing injection stretch blow molded containers.

For the purposes of the invention, olefin polymers are homo- or copolymers of linear or branched α olefins, in particular of $C_2$–$C_{10}$-alk-1-enes, such as ethylene, propylene, 1-butene, 1-pentene, 1-hexene, 1-heptene, 1-octene, 1-nonene, 1-decene or 4-methyl-1-pentene, or mixtures of these α-olefins. Preference is given to homo- or copolymers of ethylene or of propylene, where the proportion of ethylene or of propylene in the copolymers is at least 50 mol %. Among the copolymers of ethylene, preference is given to those which comprise, as other monomers, propylene, 1-butene, 1-hexene or 1-octene, or mixtures of these. The copolymers of propylene are in particular those which comprise, as other monomers, ethylene or 1-butene, or mixtures of these. The propylene copolymers may comprise the other α olefins incorporated randomly. They may also take the form of block copolymers or impact copolymers. Preferred polymers of propylene are propylene homopolymers and random propylene copolymers. Olefin polymers of this type are known per se or may be prepared by known methods by polymerizing with conventional Ziegler-Natta catalysts or with metallocene catalysts.

The olefin polymers of which the novel injection stretch blow molded containers are composed comprise propylene polymers, which are obtainable by polymerizing the corresponding monomers with metallocene catalysts. The proportion of the propylene polymers which are obtainable with metallocene catalysts is generally at least 40% by weight, preferably at least 70% by weight and in particular at least 90% by weight, based on the olefin polymers. In a very particularly preferred embodiment, the olefin polymers are obtained by homopolymerization of propylene or copolymerization of propylene with other $C_2$–$C_{10}$-alk-1-enes with metallocene catalysts.

The propylene polymers which are obtainable with metallocene catalysts are propylene homopolymers or copolymers made from propylene and another $C_2$–$C_{10}$-alk-1-ene or more than one other $C_2$–$C_{10}$-alk-1-ene, preferably selected from the class consisting of ethylene, 1-butene, 1-pentene, 1-hexene, 1-heptene, 1-octene, 1-nonene, 1-decene and 4-methyl-1-pentene, or are mixtures of these polymers, in which case the mixing ratios are not critical. The copolymers of propylene used are generally random copolymers.

For the purposes of the invention, metallocene catalysts are substances which are generally obtained by combining a transition metal compound or more than one transition metal compound, preferably of titanium, of zirconium or of hafnium, and comprising at least one ligand which, in the broadest sense, is a derivative of the cyclopentadienyl ligand, with an activator, also called cocatalyst or metallocenium-ion-forming compound, and generally have activity for polymerizing the monomers described. Examples of such catalysts are described in EP-A 545 303, EP-A 576 970 and EP-A 582 194. Metallocene catalysts which are suitable according to the invention generally comprise, as active constituents, A) one or more metallocene complexes of the general formula (I)

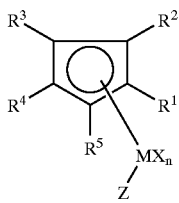

(I)

where:

M is titanium, zirconium, hafnium, vanadium, niobium or tantalum, or also elements of the 3rd subgroup of the Periodic Table or of the lanthanoides, X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^6$ or —$NR^6R^7$, n is 1, 2 or 3, where n is the valence of M minus the number 2, where $R^6$ and $R^7$ are $C_1$–$C_{10}$-alkyl, $C_6$–$C_{15}$-aryl, alkylaryl, arylalkyl, fluoroalkyl or fluoroaryl having in each case from 1 to 10 carbon atoms in the alkyl radical and from 6 to 20 carbon atoms in the aryl radical, and the radicals X are identical or different, $R^1$ to $R^5$ are hydrogen, $C_1$–$C_{10}$-alkyl, 5- to 7-membered cycloalkyl, which in turn may be $C_1$–$C_{10}$-alkyl-substituted, $C_6$–$C_{15}$-aryl or arylalkyl, where two adjacent radicals together may also be saturated or unsaturated cyclic groups having from 4 to 15 carbon atoms, or Si($R^8$)$_3$, where may be $C_1$–$C_{10}$-alkyl, $C_3$–$C_{10}$-cycloalkyl or $C_6$–$C_{15}$-aryl, and Z is X or 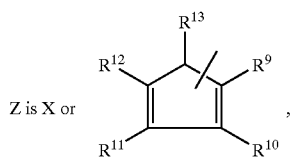, where $R^9$ to $R^{13}$ are hydrogen, $C_1$–$C_{10}$-alkyl, 5- to 7-membered cycloalkyl, which in turn may be $C_1$–$C_{10}$-alkyl-substituted, $C_6$–$C_{15}$-aryl or arylalkyl, where two adjacent radicals together may also be saturated or unsaturated cyclic groups having from 4 to 15 carbon atoms, or Si($R^{14}$)$_3$, where $R^{14}$ is $C_1$–$C_{10}$-alkyl, $C_3$–$C_{10}$-cycloalkyl or $C_6$–$C_{15}$-aryl, or where $R^4$ and Z together form a grouping —$R^{15}$-A-, where $R^{15}$ is 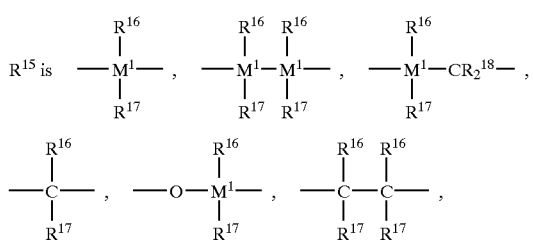

=$BR^{16}$, =$AlR^{16}$, —Ge—, —Sn—, —O—, —S—, =SO, =$SO_2$, =$NR^{16}$, =CO, =$PR^{16}$ or =$P(O)R^{16}$, where each of $R^{16}$, $R^{17}$ and $R^{18}$ is identical or different and is hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl, or where two adjacent radicals, in each case with the atoms linking them, form a saturated or unsaturated ring having from 4 to 15 carbon atoms, and $M^1$ is silicon, germanium or tin, A is 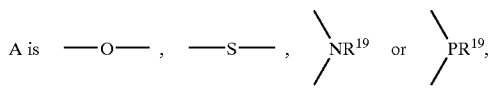

where $R^{19}$ is $C_1$–$C_{10}$-alkyl, $C_6$–$C_{15}$-aryl, $C_3$–$C_{10}$-cycloalkyl, $C_7$–$C_{18}$-alkylaryl or Si($R^{20}$)$_3$, $R^{20}$ is hydrogen, $C_1$–$C_{10}$-alkyl, $C_6$–$C_{15}$-aryl, which may in turn be substituted with $C_1$–$C_4$-alkyl groups, or is $C_3$–$C_{10}$-cycloalkyl, or where $R^4$ and $R^{12}$ together form a grouping —$R^{15}$-, and B) one or more metallocenium-ion-forming compounds.

The radicals X in the general formula (I) are preferably identical.

Among the metallocene complexes of the general formula (I), preference is given to

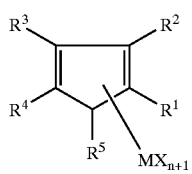

(Ia),

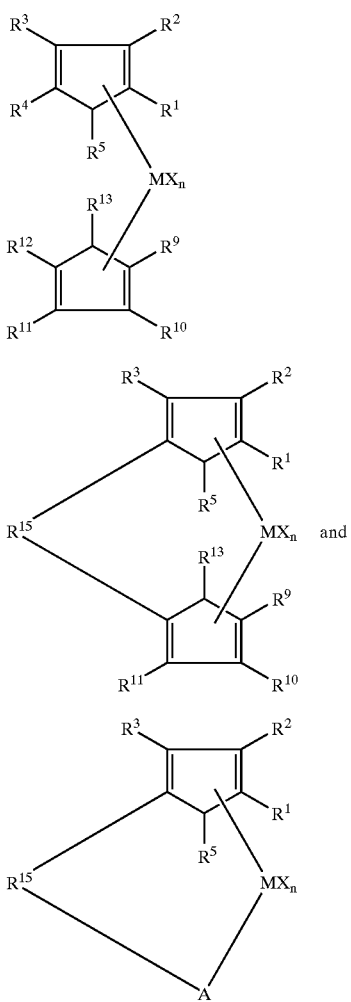

(Ib), (Ic)

(Id).

Among the compounds of the formula (Ia), preference is given in particular to those in which M is titanium, zirconium or hafnium,
X is chlorine, $C_1$–$C_4$-alkyl or phenyl,
n is the number 2 and
$R^1$ to $R^5$ are hydrogen or $C_1$–$C_4$-alkyl.

Among the compounds of the formula (Ib), preference is given to those in which

M is titanium, zirconium or hafnium,
X is chlorine, $C_1$-alkyl or phenyl,
n is the number 2,
$R^1$ to $R^5$ are hydrogen, $C_1$–$C_4$-alkyl or $Si(R^8)_3$ and
$R^9$ to $R^{13}$ are hydrogen, $C_1$–$C_4$-alkyl or $Si(R^{14})_3$.

Particularly suitable compounds of the formula (Ib) are those in which the cyclopentadienyl radicals are identical.

Examples of particularly suitable compounds are:

bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride,
and also the corresponding dimethylzirconium compounds.

Particularly suitable compounds of the formula (Ic) are those in which $R^1$ and $R^9$ are identical and are hydrogen or $C_1$–$C_{10}$-alkyl,
$R^5$ and $R^{13}$ are identical and are hydrogen, methyl, ethyl, isopropyl or tert-butyl,
$R^3$ and $R^{11}$ are $C_1$–$C_4$-alkyl and
$R^2$ and $R^{10}$ are hydrogen or
two adjacent radicals $R^2$ and $R^3$, or also $R^{10}$ and $R^{11}$, together are a saturated or unsaturated cyclic group having from 4 to 12 carbon atoms,

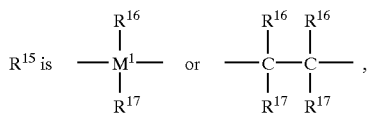

M is titanium, zirconium or hafnium, and
X is chlorine, $C_1$–$C_4$-alkyl or phenyl.

Examples of particularly suitable complex compounds are dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-ethylindenyl)zirconium dichloride,
dimethylsilanediylbis[3,3'-(2-methylbenzindenyl)]zirconium dichloride,
dimethylsilanediylbis[3,3'-(2-ethylbenzindenyl)]zirconium dichloride,
methylphenylsilanediylbis[3,3'-(2-ethylbenzindenyl)]zirconium dichloride,
methylphenylsilanediylbis[3,3'-(2-methylbenzindenyl)]zirconium dichloride,
diphenylsilanediylbis[3,3'-(2-methylbenzindenyl)]zirconium dichloride,
diphenylsilanediylbis[3,3'-(2-ethylbenzindenyl)]zirconium dichloride, and
diphenylsilanediylbis(2-methylindenyl)hafnium dichloride, and also the corresponding dimethylzirconium compounds.

Other examples of suitable complex compounds are dimethylsilanediylbis(2-methyl-4-phenylindenyl)zirconium dichloride, dimethylsilanediylbis(2-methyl-4-naphthylindenyl) zirconium dichloride,
dimethylsilanediylbis(2-methyl-4-isopropylindenyl) zirconium dichloride, and
dimethylsilanediylbis(2-methyl-4,6-diisopropylindenyl) zirconium dichloride, and also the corresponding dimethylzirconium compounds.

Particularly suitable compounds of the general formula (Id) are those in which

M is titanium or zirconium,

X is chlorine, $C_1$–$C_4$-alkyl or phenyl.

$$R^{15} \text{ is } \quad -\underset{\underset{R^{17}}{|}}{\overset{\overset{R^{16}}{|}}{M^1}}- \quad \text{or} \quad -\underset{\underset{R^{17}}{|}}{\overset{\overset{R^{16}}{|}}{C}}-\underset{\underset{R^{17}}{|}}{\overset{\overset{R^{16}}{|}}{C}}-,$$

$$A \text{ is } \quad -O-, \quad -S-, \quad \diagdown N R^{19}$$

and $R^1$ to $R^3$ and $R^5$ are hydrogen, $C_1$–$C_{10}$-alkyl, $C_3$–$C_{10}$-cycloalkyl, $C_6$–$C_{15}$-aryl or $Si(R^8)_3$, or where two adjacent radicals are a cyclic group having from 4 to 12 carbon atoms.

Complex compounds of this type may be synthesized by methods known per se. Preference is given to reacting the corresponding substituted cyclic hydrocarbon anions with halides of titanium, zirconium, hafnium, vanadium, niobium or tantalum.

Examples of corresponding preparation processes are described, inter alia, in the Journal of Organometallic Chemistry, 369 (1989), 359–370.

It is also possible to use mixtures of different metallocene complexes.

Examples of suitable metallocenium-ion-forming compounds B) are strong neutral Lewis acids, ionic compounds with Lewis-acid cations and ionic compounds with Brönsted acids as cations.

Preferred strong, neutral Lewis acids are compounds of the general formula (II)

$$M^2X^1X^2X^3 \qquad (II)$$

where $M^2$ is an element of the 3rd main group of the Periodic Table, in particular B, Al or Ga, preferably B, and $X^1$, $X^2$ and $X^3$ are hydrogen, $C_1$–$C_{10}$-alkyl, $C_6$–$C_{15}$-aryl, alkylaryl, arylalkyl, haloalkyl or haloaryl with in each case from 1 to 10 carbon atoms in the alkyl radical and from 6 to 20 carbon atoms in the aryl radical or fluorine, chlorine, bromine or iodine, in particular haloaryl, preferably pentafluorophenyl.

Particular preference is given to compounds of the general formula (II), in which $X^1$, $X^2$ and $X^3$ are identical, preferably tris(pentafluorophenyl)borane.

Suitable ionic compounds with Lewis-acid cations are compounds of the general formula (III)

$$[(Y^{a+})Q_1Q_2 \ldots Q_z]^{d+} \qquad (III)$$

where

Y is an element of the 1st to 6th main group or of the 1st to 8th subgroup of the Periodic Table, $Q_1$ to $Q_z$ are radicals with a single negative charge, such as $C_1$–$C_{28}$-alkyl, $C_6$–$C_{15}$-aryl, alkylaryl, arylalkyl, haloalkyl, haloaryl with in each case from 6 to 20 carbon atoms in the aryl radical and from 1 to 28 carbon atoms in the alkyl radical, $C_3$–$C_{10}$-cycloalkyl, which may be unsubstituted or substituted with $C_1$–$C_{10}$-alkyl groups, or are halogen, $C_1$–$C_{28}$-alkoxy, $C_6$–$C_{15}$-aryloxy, silyl or mercaptyl, a is an integer from 1 to 6, z is an integer from 0 to 5, and d is the difference a–z, and is greater than or equal to 1.

Particularly suitable cations are carbonium cations, oxonium cations and sulfonium cations, and also cationic transition metal complexes. The triphenylmethyl cation, the silver cation and the 1,1'-dimethylferrocenyl cation should be mentioned in particular. They preferably have non-coordinating counterions, in particular boron compounds, as also mentioned in WO 91/09882, preferably tetrakis (pentafluorophenyl)borate.

Ionic compounds with Brönsted acids as cations and preferably likewise non-coordinating counterions are mentioned in WO 91/09882, and a preferred cation is N,N-dimethylanilinium.

The amount of strong, neutral Lewis acids, of ionic compounds with Lewis-acid cations or of ionic compounds with Brönsted acids as cations is preferably from 0.1 to 10 equivalents, based on the metallocene complex A).

Particularly suitable metallocenium-ion-forming compounds B) are open-chain or cyclic aluminoxane compounds of the general formulae (IV) or (V)

$$\underset{R^{21}}{\overset{R^{21}}{\diagdown}}Al-\left[O-\underset{\underset{R^{21}}{|}}{Al}\right]_m-R^{21} \qquad (IV)$$

$$\left[O-\underset{\underset{R^{21}}{|}}{Al}\right]_m \qquad (V)$$

where $R^{21}$ is $C_1$–$C_4$-alkyl, preferably methyl or ethyl, and m is an integer from 5 to 30, preferably from 10 to 25.

These oligomeric aluminoxane compounds are generally prepared by reacting a solution of trialkylaluminum with water, as described, inter alia, in EP-A 284 708 and U.S. Pat. No. 4,794,096.

The oligomeric aluminoxane compounds thus obtained are generally mixtures of different linear and/or cyclic long-chain molecules, and m is therefore to be regarded as an average value. The aluminoxane compounds may also be present in a mixture with other metal alkyl compounds, preferably with alkylaluminum compounds.

It has proven advantageous to use amounts of the metallocene complexes A) and of the oligomeric aluminoxane compounds of the general formulae (IV) or (V) which give an atomic ratio of aluminum from the oligomeric aluminoxane compounds to transition metal from the metallocene complexes in the range from 10:1 to $10^6$:1, in particular from 10:1 to $10^4$:1.

It is moreover possible for the component B) used to be aryloxyaluminoxanes, as described in U.S. Pat. No. 5,391,793, aminoaluminoxanes, as described in U.S. Pat. No. 5,371,260, aminoaluminoxane hydrochlorides, as described in EP-A 633 264, siloxyaluminoxanes, as described in EP-A 621 279, or mixtures of these, instead of the aluminoxane compounds of the general formulae (IV) or (V).

The metallocene complexes A), and also the metallocenium-ion-forming compounds B), are preferably used in solution, particular preference being given to aromatic hydrocarbons having from 6 to 20 carbon atoms, in particular xylenes and toluene.

Suitable metallocene catalysts may also comprise, as further component C), a metallic compound of the general formula (VI)

$$M^3(R^{22})_r(R^{23})_s(R^{24})_t \quad \quad (VI)$$

where

M$^3$ is an alkali metal, an alkaline-earth metal or a metal of the 3rd main group of the Periodic Table i.e. boron, aluminum, gallium, indium or thallium, R$^{22}$ is hydrogen, $C_1$–$C_{10}$-alkyl, $C_6$–$C_{15}$-aryl, alkylaryl or arylalkyl having in each case from 1 to 10 carbon atoms in the alkyl radical and from 6 to 20 carbon atoms in the aryl radical, R$^{23}$ and R$^{24}$ are hydrogen, halogen, $C_1$–$C_{10}$-alkyl, $C_6$–$C_{15}$-aryl, alkylaryl, arylalkyl or alkoxy having in each case from 1 to 10 carbon atoms in the alkyl radical and from 6 to 20 carbon atoms in the aryl radical, r is an integer from 1 to 3, and s and t are integers from 0 to 2, and the total r+s+t corresponds to the valence of M$^3$.

Among the metallic compounds of the general formula (VI), preference is given to those in which M$^3$ is lithium, magnesium or aluminum, and R$^{23}$ and R$^{24}$ are $C_1$–$C_{10}$-alkyl.

Particularly preferred metallic compounds of the formula (VI) are n-butyllithium, n-butyl-n-octylmagnesium, n-butyl-n-heptyl-magnesium, tri-n-hexylaluminum, tri-isobutylaluminum, triethylaluminum and trimethylaluminum.

If a metallic compound C) is used, it is preferably present in the catalyst system in an amount which gives a molar ratio of M$^3$ from formula (VI) to transition metal M from formula (I) of from 800:1 to 1:1, in particular from 500:1 to 50:1.

The metallocene complexes A) may also be used on a support material.

The support materials used are preferably finely divided supports which generally have a particle diameter in the range from 1 to 300 μm, in particular from 20 to 90 μm. Examples of suitable support materials are inorganic oxides of silicon, of aluminum, of titanium, or of one of the metals of the 1st or 2nd main group of the Periodic Table, among which, besides alumina and magnesium oxide and phyllosilicates, preference is in particular given to silica gel.

Preferred support materials are composed of primary particles with average particle diameters of from 1 to 20 μm, in particular from 1 to 5 μm, and have voids and channels with an average diameter of from 0.1 to 20 μm, in particular 1 to 15 μm. The macroscopic portion by volume of the voids and channels is from 8 to 30%, preferably from 10 to 30% and in particular from 15 to 25%, of the totality of the particle. Preferred support materials of this type are obtained, for example, by spray drying of suitable suspensions of primary particles.

Examples of other supports are finely divided polyolefins, for example finely divided polypropylene.

The propylene polymers obtainable with metallocene catalysts may be prepared, either batchwise or preferably continuously, in the reactors which are usual for polymerizing olefins. Examples of suitable reactors are continuously-operated stirred tank reactors, and it is also possible, if desired, to use a series of more than one stirred tank reactor connected in series. The polymerizaiton reactions may be carried out in the gas phase, in suspension, in liquid monomers, in supercritical monomers, or in inert solvents.

The polymerization conditions are not critical per se. Pressures of from 1 to 3500 bar, preferably from 2 to 100 bar have proven suitable, as have temperatures of from 0 to 400° C., preferably from 20 to 250° C. and in particular from 50 to 100° C.

The homopolymerizations of propylene or the copolymerizations of propylene with $C_2$–$C_{10}$-alk-1-enes are preferably carried out in the gas phase, for example in fluidized-bed reactors or in agitated powder bed reactors. Polymerization conditions well suited for this are polymerization pressures in the range from 10 to 40 bar and polymerization temperatures in the range from 50 to 100° C. The polymerization may also, of course, take place in a series of more than one, preferably two, reactors connected to one another in series.

The average molar mass of the polymers may be controlled using the methods usual in polymerization technology, for example by introducing molar mass regulators, such as hydrogen, which gives a reduction in the molar mass of the polymer, or by varying the polymerization temperature. High polymerization temperatures likewise usually give reduced molar masses.

The homopolymers of propylene or the copolymers of propylene with $C_2$–$C_{10}$-alk-1-enes, obtainable with metallocene catalysts, generally have a melt flow rate (MFR), measured at 230° C. under a weight of 2.16 kg in accordance with ISO 1133, in the range from 0.1 to 1000 g/10 min, preferably from 0.5 to 200 g/10 min, in particular from 1 to 100 g/10 min, and very particularly preferably from 2 to 50 g/10 min. Melt flow rates of this type usually correspond to average molar masses (weight average $M_w$) of the propylene polymers, measured by the gel permeation chromatography (GPC) method at 140° C. in 1,2,4-trichlorobenzene against a polypropylene standard, in the range from 50,000 to 1,000,000 g/mol.

The molar mass distribution $M_w/M_n$ of the homopolymers of propylene or of the copolymers of propylene with $C_2$–$C_{10}$-alk-1-enes, obtainable with metallocene catalysts, determined using GPC as for the average molar mass $M_w$, is generally in the range from 1.2 to 6.0, preferably from 1.5 to 3.0.

Both the molar mass $M_w$ and the molar mass distribution $M_w/M_n$, and also in particular the MFR, may also be adjusted by the method of peroxidically initiated degradation of a starting polymer, advantageously in an extruder. This method is known to the person skilled in the art.

The propylene homopolymers obtainable with metallocene catalysts generally have a melting point, determined by the differential scanning calorimetry (DSC) method (heating rate 20° C./min), in the range from 80 to 165° C., preferably from 100 to 165° C. and in particular from 120 to 160° C.

The copolymers of propylene with other $C_2$–$C_{10}$-alk-1-enes generally have a melting point determined by DSC (heating rate 20° C./min) in the range from 60 to 160° C., preferably from 100 to 160° C. and in particular from 120 to 160° C.

The proportion of chemically bonded comonomer in the copolymers of propylene with other $C_2$–$C_{10}$-alk-1-enes, measured by $^{13}$C NMR spectroscopy, for example, is generally in the range from 0.001 to 35 mol %, preferably from 0.01 to 15 mol %, based on the copolymer.

Propylene homopolymers or copolymers of propylene with other $C_2$–$C_{10}$-alk-1-enes with very good suitability according to the invention are obtained if the corresponding monomers are polymerized in the presence of a metallocene catalyst which comprises dimethylsilanediylbis[3,3'-(2-methylbenzindenyl)]zirconium dichloride as metallocene complex (I).

The propylene homopolymers or propylene copolymers obtained in this way then generally have the polymer properties already mentioned above, such as MFR, $M_w$, $M_w/M_n$, melting point, pentad content and comonomer content.

Preferred copolymers of propylene with other $C_2$–$C_{10}$-alk-1-enes obtainable with the dimethylsilanediylbis[3,3,'-(2-methylbenzindenyl)]zirconium dichloride catalyst are random copolymers of propylene and ethylene with, based on the polymer, from 0.1 to 10 mol %, preferably from 0.2 to 7 mol %, of units derived from ethylene, or are random copolymers of propylene and 1-butene with, based on the polymer, from 0.5 to 20 mol %, preferably from 1 to 15 mol %, of units derived from 1-butene, or are random terpolymers of propylene, ethylene and 1-butene with, based on the terpolymer, from 0.1 to 10 mol %, preferably from 0.2 to 7 mol %, of units derived from ethylene and, based on the terpolymer, from 0.5 to 20 mol %, preferably from 1 to 15 mol %, of units derived from 1-butene.

The olefin polymers suitable for producing the novel injection stretch blow molded containers may comprise additives such as stabilizers, lubricants, mold-release agents, fillers, antistats, plasticizers, dyes, pigments, flame retardants or nucleating agents, which are added in the usual amounts before use. These are generally incorporated into the polymer during pelletizing of the polymerization product, which is produced in the form of a powder.

Additives of this type are generally commercially available and are described, for example, in Gächter/Müller, Plastics Additives Handbook, 4th Edition, Hansa Publishers, Munich, 1993.

Usual stabilizers are antioxidants, such as sterically hindered phenols, process stabilizers, such as phosphites or phosphonites, neutralizing agents, such as calcium stearate or zinc stearate or dihydrotalcite, sterically hindered amines, or else UV stabilizers. The polymers according to the invention generally comprise one or more of the stabilizers in amounts of up to 2% by weight.

Examples of suitable lubricants and mold-release agents are fatty acids, calcium salts of the fatty acids, zinc salts of the fatty acids, fatty amides and low-molecular-weight polyolefin waxes, which are usually used in concentrations of up to 2% by weight.

Examples of possible fillers which may be used for the random propylene copolymers are talc, chalk or glass fibers, and amounts of up to 50% by weight may be used here.

Olefin polymers preferably used for producing the injection stretch blow molded containers comprise nucleating agents suitable for improving transparency. Examples of usual nucleating agents are inorganic additives, such as talc, silica or kaolin, salts of mono- or polycarboxylic acids, such as sodium benzoate or aluminum tert-butyl benzoate, or salts of phosphoric diesters, such as sodium 2,2'-methylenebis(4, 6-di-tert-butylphenyl)phosphate. Nucleating agents whose use is preferred are dibenzylidenesorbitol or its $C_1$–$C_8$-alkyl-substituted derivatives such as methyl- or dimethyldibenzylidenesorbitol. The content of nucleating agents is generally up to 5% by weight, preferably up to 3% by weight and in particular up to 1% by weight, based on the olefin polymers.

To produce the novel injection stretch blow molded containers, it is usual firstly to injection mold parisons from olefin polymers, comprising homopolymers of propylene or comprising copolymers of propylene with other $C_2$–$C_{10}$-alk-1-enes, which are obtainable by polymerizing the corresponding monomers with metallocene catalysts, or preferably exclusively from homopolymers of propylene or copolymers of propylene with other $C_2$–$C_{10}$-alk-1-enes obtainable with metallocene catalysts. After this, the parisons are stretch blow molded.

This may take place in a single-step procedure. In that case, the injection molding of the parison and the stretch blow molding take place in the same machine, the parison being cooled rapidly to the stretching temperature. The advantage of the single-step process is in particular the saving of energy.

It is also possible to proceed in two steps. In that case, the parison is firstly injection molded. The parison is then generally allowed to cool to room temperature, making it easy to store. The parison is then heated once again for the independent stretch blow molding step. This two-step injection stretch blow molding process is therefore also frequently termed the reheat process. An advantage of the two-step process is that the two steps are independent of one another and better control of temperature is possible during stretch blow molding.

With both versions it is possible to carry out the stretch blow molding in two steps. In that case, the parison is firstly preblown in a first step, and after that is stretch blow molded in a further step.

The injection molding of the parison usually takes place at melt temperatures of from 200 to 280° C., and the stretch blow molding at from 100 to 160° C. with a stretch blow molding pressure of from 10 to 50 bar and a stretching ratio of from 1:2 to 1:7. If preblowing is carried out, this takes place at from 110 to 150° C. with a preblowing pressure of from 1 to 10 bar and a stretching ratio of from 1:2 to 1:5.

The novel containers have, inter alia, the capability of being produced in a wider temperature window than containers produced from olefin polymers which comprise no propylene polymers obtainable with metallocene catalysts. This permits smooth continuous operation with low personnel costs in manufacturing. In addition, they can be produced with reduced cycle times. The containers have uniform wall thicknesses, high gloss and excellent transparency, which may be further improved by adding nucleating agents. The containers have good stiffness and toughness and, because of their low content of soluble fractions, are suitable in particular for applications in the food and drink and medical sectors.

EXAMPLES

Round bottles of one liter capacity and weighing 30 gram when empty were produced in an injection stretch blow molding process encompassing three steps. Firstly, a parison was injection molded in a first step, and in a second step was then removed from the injection mold and transferred into a preblowing apparatus, where the parison was brought to a specified temperature and preblown at 4 bar. In a third step, the preblown parison was stretch blow molded using a pressure of 17 bar.

The temperature of the preblowing step was varied in each of the ranges stated, and the containers were tested for transparency and uniformity of shape. At the same time, the temperature window within which commercially acceptable products were obtainable was determined.

Example 1

Propylene was homopolymerized in a gas-phase reactor with vertical agitation at 60° C., at a pressure of 24 bar and with an average residence time of 1.5 h, in the presence of hydrogen as molar mass regulator, using a dimethylsilanediylbis-[3,3'-(2-methylbenzindenyl)]zirconium dichloride/methylaluminoxane catalyst supported on silica gel. This gave a propylene homopolymer with a melting point of 147° C., an MFR (230° C./2.16 kg) of 3.8 g/10 min and an $M_w/M_n$ ratio of 2.0.

This polymer was used to produce the abovementioned bottles by injection stretch blow molding. The temperature of the preblowing step was varied in the range from 110 to 130° C. The temperature window within which highly transparent bottles of uniform wall thickness were obtained was 8° C.

Example 2

In a manner similar to that of Example 1, a propylene-1-butene copolymer was polymerized with 3.5% by weight of 1-butene. It had a melting point of 134° C., an MFR (230° C./2.16 kg) of 3.8 g/10 min and an $M_w/M_n$ ratio of 2.2.

Bottles were produced by injection stretch blow molding as in Example 1. The temperature of the preblowing step was varied in the range from 110 to 130° C. The temperature window in which highly transparent bottles of uniform wall thickness were obtained was 12° C.

Comparative Example A

As in Example 1, bottles were produced by injection stretch blow molding using a commercial propylene homopolymer prepared using a conventional Ziegler-Natta catalyst (NOVOLEN® 1100L from BASF Aktiengesellschaft with a melting point of 164° C., an MFR (230° C./2.16 kg) of 6 g/10 min, an $M_w/M_n$ ratio of 5 and a content of 3% by weight of fractions soluble in xylene at room temperature). The temperature of the preblowing step was varied in the range from 140 to 160° C. The temperature window within which highly transparent bottles of uniform wall thickness were obtained was 2° C.

Comparative Example B

As in Example 2, bottles were produced by injection stretch blow molding using a commercial propylene copolymer with 2.5% by weight of ethylene prepared using a conventional Ziegler-Natta catalyst (NOVOLEN® 3200MC from BASF Aktiengesellschaft with a melting point of 145° C., an MFR (230° C./2.16 kg) of 8 g/10 min, an $M_w/M_n$ ratio of 4.5 and a content of 6.5% by weight of fractions soluble in xylene at room temperature). The temperature of the preblowing step was varied in the range from 115 to 140° C. The temperature window within which highly transparent bottles of uniform wall thickness were obtained was 6° C.

We claim:

1. A process for producing injection stretch blow molded containers from olefin polymers by injection molding parisons at melt temperatures of from 200 to 280° C. and then stretch blow molding the parisons at from 100 to 160° C., which comprises stretch blow molding olefin polymers comprising at least 40% by weight, based on the olefin polymers, of homopolymers of propylene or copolymers of propylene with other $C_2$–$C_{10}$ 1-alkenes, which are obtained by polymerizing the appropriate monomers with metallocene catalysts comprising, as active constituents, A) one or more metallocene complexes of the general formula (Ic)

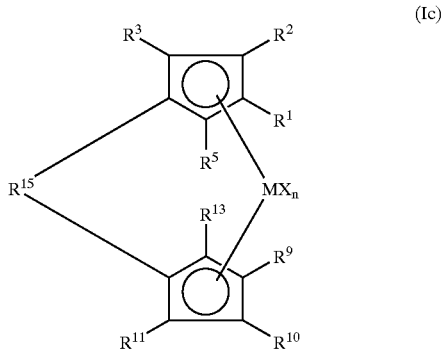

where:
M is titanium, zirconium, hafnium, vanadium, niobium or tantalum, or else elements of the 3rd subgroup of the Periodic Table or of the lanthanoids,
X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^6$ or —$NR^6R^7$,
n is 1, 2 or 3, where n is the valence of M minus the number 2, where
$R^6$ and $R^7$ are $C_1$–$C_{10}$-alkyl, $C_6$–$C_{15}$-aryl, alkylaryl, arylalkyl, fluoroalkyl or fluoroaryl having in each case from 1 to 10 carbon atoms in the alkyl radical and from 6 to 20 carbon atoms in the aryl radical, and
the radicals X are identical or different,
$R^1$ to $R^3$, $R^5$, $R^9$ to $R^{11}$ and $R^{13}$ are hydrogen, $C_1$–$C_{10}$-alkyl, 5- to 7-membered cycloalkyl, which in turn may be $C_1$–$C_{10}$-alkyl-substituted, $C_6$–$C_{15}$-aryl or arylalkyl, where two adjacent radicals together may also be saturated or unsaturated cyclic groups having from 4 to 15 carbon atoms, or $Si(R^8)_3$, where
$R^8$ may be $C_1$–$C_{10}$-alkyl, $C_3$–$C_{10}$-cycloalkyl or $C_6$–$C_{15}$-aryl, and

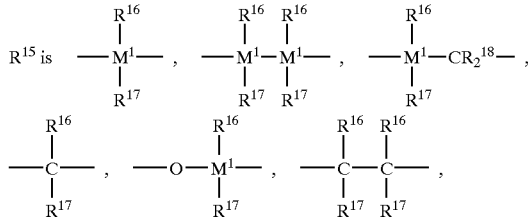

$BR^{16}$, =$AlR^{16}$, —Ge—, —Sn—, —O—, —S—, =SO, =$SO_2$, =$NR^{16}$, =CO, =$PR^{16}$ or =P(O)$R^{16}$, where
each of $R^{16}$, $R^{17}$ and $R^{18}$ is identical or different and is hydrogen, halogen, $C_1$–$C_{10}$-alkyl, $C_1$–$C_{10}$-fluoro-alkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl, or where two adjacent radicals, in each case with the atoms linking them, form a saturated or unsaturated ring having from 4 to 15 carbon atoms, and
$M^1$ is silicon, germanium or tin,
and two adjacent radicals $R^2$ and $R^3$ and two adjacent radicals $R^{10}$ and $R^{11}$ are in each case together a ring having from 4 to 15 carbon atoms, and B) one or more metallocenium-ion-forming compounds.

2. A process for producing injection stretch blow molded containers as claimed in claim 1, where the olefin polymers are homopolymers of propylene or copolymers of propylene with other $C_2$–$C_{10}$ 1-alkenes, obtainable by polymerizing the appropriate monomers with metallocene catalysts.

3. A process for producing injection stretch blow molded containers as claimed in claim 1, where the homopolymers of propylene or copolymers of propylene with other $C_2$–$C_{10}$ 1-alkenes, obtainable using metallocene catalysts, have a melting point of from 120 to 165° C.

4. A process for producing injection stretch blow molded containers as claimed in claim 1, where the homopolymers of propylene or copolymers of propylene with other $C_2$–$C_{10}$ 1-alkenes, obtainable using metallocene catalysts, have a melt flow rate MFR of from 2 to 50 g/10 min at 23° C. with a load of 2.16 kg.

5. A process for producing injection stretch blow molded containers as claimed in claim 1, where the olefin polymers comprise up to 5% by weight, based on the olefin polymers, of nucleating agents as a further component.

6. At injection stretch blow molded container as claimed in claim 1, where the metallocene complex (Ic) is dimethylsilanedilybis[3,3'-(2-methylbenzindenyl)]zirconium dichloride.

\* \* \* \* \*

UNITED STATES PATENT AND TRADEMARK OFFICE
CERTIFICATE OF CORRECTION

PATENT NO. : 6,733,717 B1
DATED : May 11, 2004
INVENTOR(S) : Marczinke et al.

It is certified that error appears in the above-identified patent and that said Letters Patent is hereby corrected as shown below:

Column 16,
Line 2, "23°C" should be -- 230°C --.
Line 9, "At injection" should be -- An injection --.

Signed and Sealed this

Thirty-first Day of May, 2005

JON W. DUDAS
*Director of the United States Patent and Trademark Office*